Figure 1:
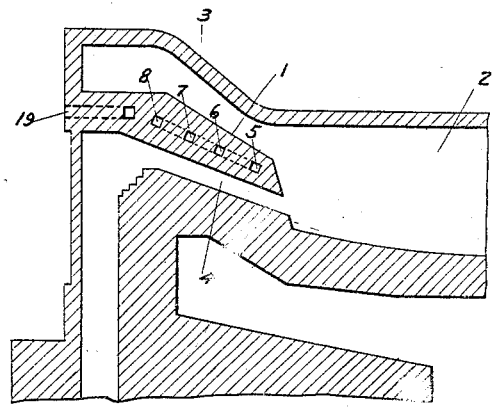

H. KNOTH.
AIR COOLED OPEN HEARTH FURNACE.
APPLICATION FILED JUNE 21, 1912.

1,044,788.

Patented Nov. 19, 1912.

2 SHEETS—SHEET 1.

Witnesses
C. A. Bradley
homie Hehn.

Inventor
HENRY KNOTH.

By
Attorney

H. KNOTH.
AIR COOLED OPEN HEARTH FURNACE.
APPLICATION FILED JUNE 21, 1912.

1,044,788.

Patented Nov. 19, 1912.

2 SHEETS—SHEET 2.

Witnesses

Inventor
HENRY KNOTH

By
Attorney

UNITED STATES PATENT OFFICE.

HENRY KNOTH, OF MONTEREY, MEXICO.

AIR-COOLED OPEN-HEARTH FURNACE.

1,044,788.

Specification of Letters Patent. Patented Nov. 19, 1912.

Application filed June 21, 1912. Serial No. 705,134.

*To all whom it may concern:*

Be it known that I, HENRY KNOTH, a citizen of the United States of America, residing at Monterey, in the State of Nueva Leon, Mexico, have invented certain new and useful Improvements in Air-Cooled Open-Hearth Furnaces, of which the following is a specification.

My invention relates to a novel, economical and effective means for cooling those portions of the walls and arches of an open hearth steel furnace or other furnace which are most subjected to destruction by the intense heat. Heretofore various attempts have been made to cool such parts of the furnace by embedding water coils but such arrangements have proved unsatisfactory because of the tendency of the water pipes to leak by becoming eroded or broken under the expansion and contraction of the furnace walls. Since water will quickly destroy the lining of the furnace frequent repairs are required for such equipments. It is also true that such systems must be kept in service whether the condition of the furnace requires it or not, and further no substantial regulation of the cooling effect is obtainable.

I have conceived the idea of cooling the port arches of the furnace, and other points if desired, by a novel arrangement of air passages, and the preferred embodiment of my invention comprises the additional important feature of arranging these air cooling passages so that the operator can see into them to the point of intensest heat from the furnace floor and can therefore readily note where the most cooling action is required.

My invention further comprises means whereby a forced circulation of air may be applied to the transverse cooling passages, and, by internal connecting passages, may be caused to flow in a circuitous course back and forth through the port arch, plugs being used to close the ends of all but the discharge end of the final passage in the circuit. Such an arrangement is very flexible for I can use one blower to create a continuous draft through all the cooling passages, or, where more air is required, I use additional blowers operating through relatively shorter passages; or, where the maximum air is required, a single blower may be applied to each cooling passage, and all the plugs dispensed with.

My invention further comprises the details of construction and arrangement of parts which are hereinafter more particularly described and claimed, reference being had to the accompanying drawings, in which:—

Figure 2:
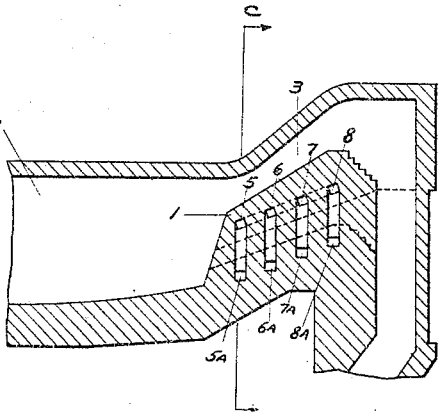
Figure 3:
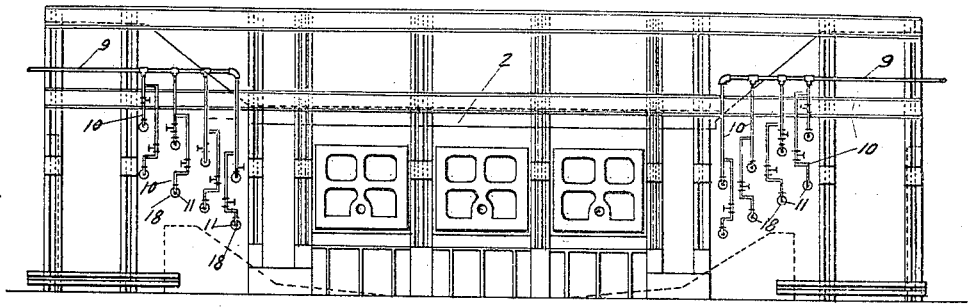
Figures 4, 5:
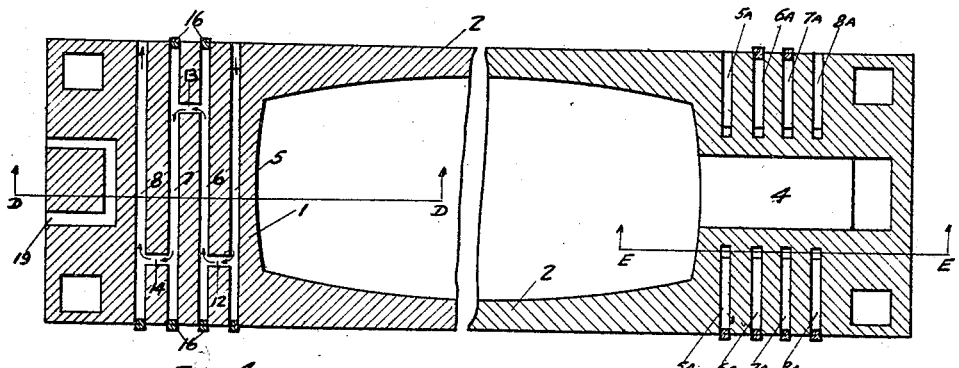
Figure 6:
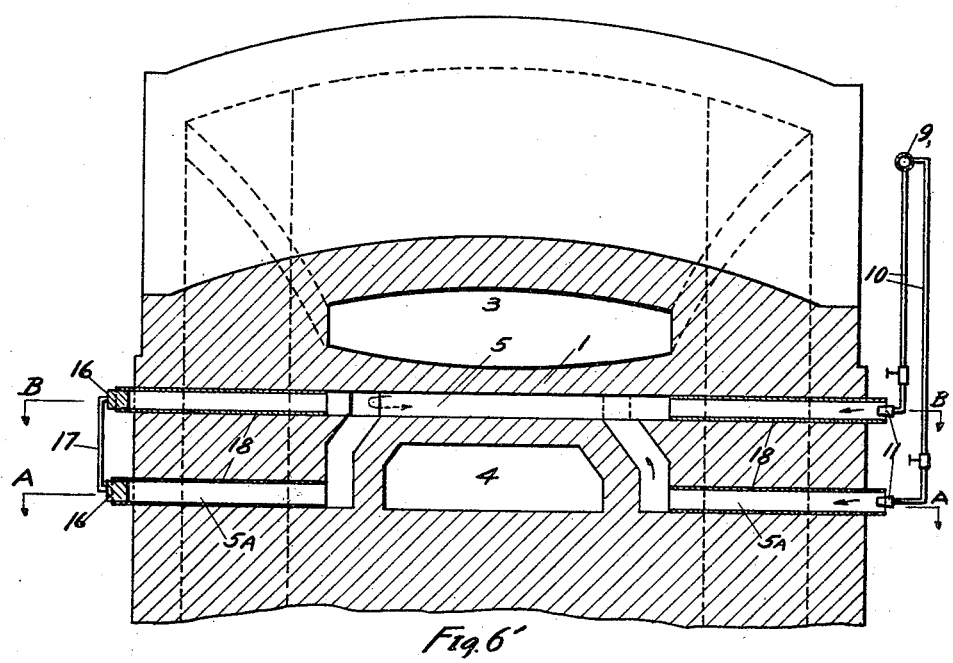

Figure 1 is a vertical sectional view through one end of the furnace taken on the line D—D of Fig. 4. Fig. 2 is a similar sectional view of the other end of the furnace taken on the line E—E of Fig. 5. Fig. 3 is a side elevation of the furnace equipped with my invention. Fig. 4 is a horizontal cross-sectional view taken through the air passages on the line B—B of Fig. 6. Fig. 5 is a similar view taken on the line A—A of Fig. 6. Fig. 6 is a vertical cross-sectional view taken on the line C—C of Fig. 2.

Similar reference numerals refer to similar parts throughout the drawings.

I have illustrated my invention as especially adapted to cooling the port arches 1 of the ordinary open hearth steel furnace 2 which has at each end an air port 3 and a gas port 4 disposed centrally under and separated by the arch from the air port. In its simplest form the air passages 5, 6, 7 and 8 are left by the mason after the fashion of checker-work passages when the arch and furnace walls are being built and these air passages preferably extend in a straight line horizontally through the port arch and through the front and rear walls of the furnace so that one may see directly through each passage. Since it is often desirable to protect the side walls of the gas flue 4, I provide also in the brick-work passages 5ª, 6ª, 7ª and 8ª which lead inwardly from each side to points adjacent to the side walls of the gas port 4 and then lead upwardly along the side walls of said port and connect respectively with the flues 5, 6, 7 and 8, which are disposed above them. By this arrangement the cooling air may be applied directly to the bricks which form the top and side walls of the gas port 4 and the bottom walls of the air port 3 which provides the most effective kind of a cooling means.

When the air passages are left open they will, even without a forced draft, afford a means of ventilating the port arch which will materially assist in cooling it. However, I prefer to equip the passages with means for producing a forced draft through them and to this end I use either air or steam which is delivered through a pipe 9 having branch pipes 10 which terminate in nozzles 11 so disposed that each may be turned into position to direct a blast of air or steam directly into an end of one of the passages. Inasmuch as this type of blower equipment is comparatively inexpensive, I prefer to equip each of the passages 5 to 8 with a separate blower. However, as will be seen by reference to Fig. 4 of my invention, the forced circulation of the air may be obtained from a less number of blowers by providing internal connecting passages 12, 13 and 14, which are arranged in staggered relation and are disposed within the side walls of the furnace, passage 12 connecting the front ends of the passages 5 and 6, the passage 13, the rear ends of the passages 6 and 7, and the passage 14, the front ends of the passages 7 and 8. I provide plugs 16 which, for convenience, are connected in pairs by iron brackets 17, so that each pair of plugs can be rapidly inserted into the open ends of the adjacent passages 6, 6ª; 7, 7ª; and 8, 8ª. If the plugs be inserted in all the open ends of the flues except the front end of the passage 5 and the rear ends of the passages 8, 8ª, it will be readily seen that the air forced by the blower into the passage 5 will take a circuitous course and will be finally discharged through the rear ends of the ports 8, 8ª. The plugs may be so inserted and the blowers utilized to cause the cooling air to flow once or any desired number of times transversely through the arch to effectively cool it.

Where steam is used I have found it desirable to form the outer ends of the passages 5, 6, 7 and 8, and 5ª, 6ª, 7ª and 8ª out of short sections of pipes 18 which extend inwardly only to points adjacent to portions of the passages which surround the gas port 4. These pipes are disposed at a slight angle so that they will drain out the water of condensation and prevent it from being absorbed by the brick-work. When the pipes are used they may be walled in at little expense in the construction of the furnace.

An additional cooling passage 19 may be let into each end wall of the furnace and arranged to pass through the brick work above the vertical gas flue which leads to the gas port 4, the said passage 19 extending inwardly and then transversely and then outwardly as the most satisfactory means of maintaining the brick work at the rear end of the arch cooled.

The number and relative arrangement of the flues may be varied to suit different operating conditions without departing from the spirit of my invention. Also air or steam may be blown through any of the channels by direct or indirect means and the improvements herein described are equally available for other types of furnaces besides open hearth. Where I refer to air passages, it will be understood to include the use of steam, or air and steam mixed, as the cooling medium.

What I claim as new and desire to secure by Letters Patent, is:—

1. A cooling system for open hearth steel furnaces comprising in combination with the port arch which separates the air and gas ports, of a series of spaced air passages which extend transversely through the port arch and have their ends left open so that they are visible from the furnace floor, and means to control independently the circulation of air through said passages.

2. In an open hearth steel furnace having air and gas ports and a port arch separating said ports, a series of spaced transverse air passages provided in the brick-work of the furnace and passing from the front wall through the arch, said passages being left open so that their several interiors may be viewed from the furnace floor, and means to separately control the circulation of the cooling medium through each of said passages.

3. In an open hearth steel furnace having air and gas ports and an arch which separates said ports, a series of air cooling passages which open through the front wall of the furnace and extend in a straight line through said arch, connecting passages which also lead from the front and rear walls upwardly at an incline to the side walls of the gas port and then upwardly to connect each with one of the first mentioned passages, and a metallic lining inserted in the inclined portion of said lower passages, substantially as described.

4. In an open hearth steel furnace having air and gas ports and an arch which separates said ports, a series of air cooling passages which pierce said arch at spaced intervals and extend in a straight line transversely through the furnace and have their ends open through the front and rear furnace walls, and an independently controllable blower means disposed in front of each passage and designed to leave the view into the passage substantially unobstructed, substantially as described.

5. In an open hearth steel furnace having air and gas ports and an arch which separates said ports, a series of air cooling passages which extend through the port arch and open through the front wall of the furnace, internal by-pass flues connecting said passages to permit of a circuitous passage for the cooling air back and forth through said arch, and means to circulate air through said circuitous passage.

6. In an open hearth steel furnace having air and gas ports and an interposed arch, a series of air cooling passages which extend in a straight line through the front and rear walls of the furnace and through the port arch, short passages disposed below said through passages and which lead inwardly to the side walls of the gas port on each side and then upwardly along the side walls of the port to connect each with one of said first mentioned passages, blower means disposed opposite one or more of the open ends of said latter passages, and means to close the open ends of one or more of said passages, substantially as described.

7. An open hearth steel furnace having air and gas ports separated by brick-work arch, the arch and walls of the furnace being provided with a number of cooling passages which extend in a straight line from the front wall of the furnace to and through the port arch, said passages having outlets through the furnace walls and there being side passages formed in the side walls of the gas port and opening above into the first mentioned passages, and means to cause the circulation of a cooling medium through said first mentioned passages, substantially as described.

8. In an open hearth steel furnace having air and gas ports, an arch separating said ports, a plurality of passages which lead inwardly from the front wall of the furnace through the port arch and are connected at their inner ends and left open at their outer ends, and means to force a circulation of a cooling medium through said passages.

In testimony whereof I affix my signature in presence of two witnesses.

HENRY KNOTH.

Witnesses:
  H. A. BUEHLER,
  W. H. ROGERS.